(12) United States Patent
Meaden (10) Patent No.: US 7,216,124 B2
(45) Date of Patent: May 8, 2007

(54) METHOD FOR GENERIC LIST SORTING

(75) Inventor: Jeffrey Alan Meaden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 09/816,179

(22) Filed: Mar. 23, 2001

(65) Prior Publication Data

US 2002/0178160 A1 Nov. 28, 2002

(51) Int. Cl.
*G06F 7/00* (2006.01)
*G06F 17/00* (2006.01)

(52) U.S. Cl. .......................................................... 707/7

(58) Field of Classification Search .................... 707/7, 707/100, 203; 712/300; 700/97
See application file for complete search history.

(56) References Cited

U.S. PATENT DOCUMENTS

| | | | | |
|---|---|---|---|---|
| 5,218,700 A | * | 6/1993 | Beechick | .................... 712/300 |
| 5,787,001 A | * | 7/1998 | Dietrich, Jr. et al. | .......... 700/97 |
| 5,963,953 A | * | 10/1999 | Cram et al. | .................. 707/100 |
| 6,275,820 B1 | * | 8/2001 | Navin-Chandra et al. | ...... 707/3 |
| 6,502,112 B1 | * | 12/2002 | Baisley | ........................ 707/203 |
| 6,751,612 B1 | * | 6/2004 | Schuetze et al. | ................ 707/4 |
| 6,801,906 B1 | * | 10/2004 | Bates et al. | ..................... 707/3 |

* cited by examiner

*Primary Examiner*—Sam Rimell
(74) *Attorney, Agent, or Firm*—Patterson & Sheridan, LLP (57) ABSTRACT

Methods, systems and articles of manufacture configured for list sorting are provided. In general, string data or non-string data contained in a plurality of lists is sorted. In one embodiment, the plurality of lists comprise at least two list types (e.g. a file list, a user list, a task list, etc.) in which one list type contains string data and one list type contains non-string data. In order to sort various data types, a generic data retrieval method/component and a specific retrieval method/component are provided. The generic data retrieval method/component may be singular, while an instance of the specific retrieval method/component may be implemented for each list type. In addition, a single generic list sorter is provided and is configured to support sorting of data received from both the generic and specific data retrieval method/components.

18 Claims, 6 Drawing Sheets

METHOD FOR GENERIC LIST SORTING

BACKGROUND OF THE INVENTION

1. Field of the Invention

Embodiments of the present invention relate to data processing. In particular, methods and systems for sorting data are provided.

2. Background of the Related Art

Computer users often require effective methods of manipulating data. One common type of data manipulation is sorting. The sorting allows users to rearrange data according to predetermined rules and user commands. For example, data items in a list may be arranged in ascending or descending order.

Figure 1:
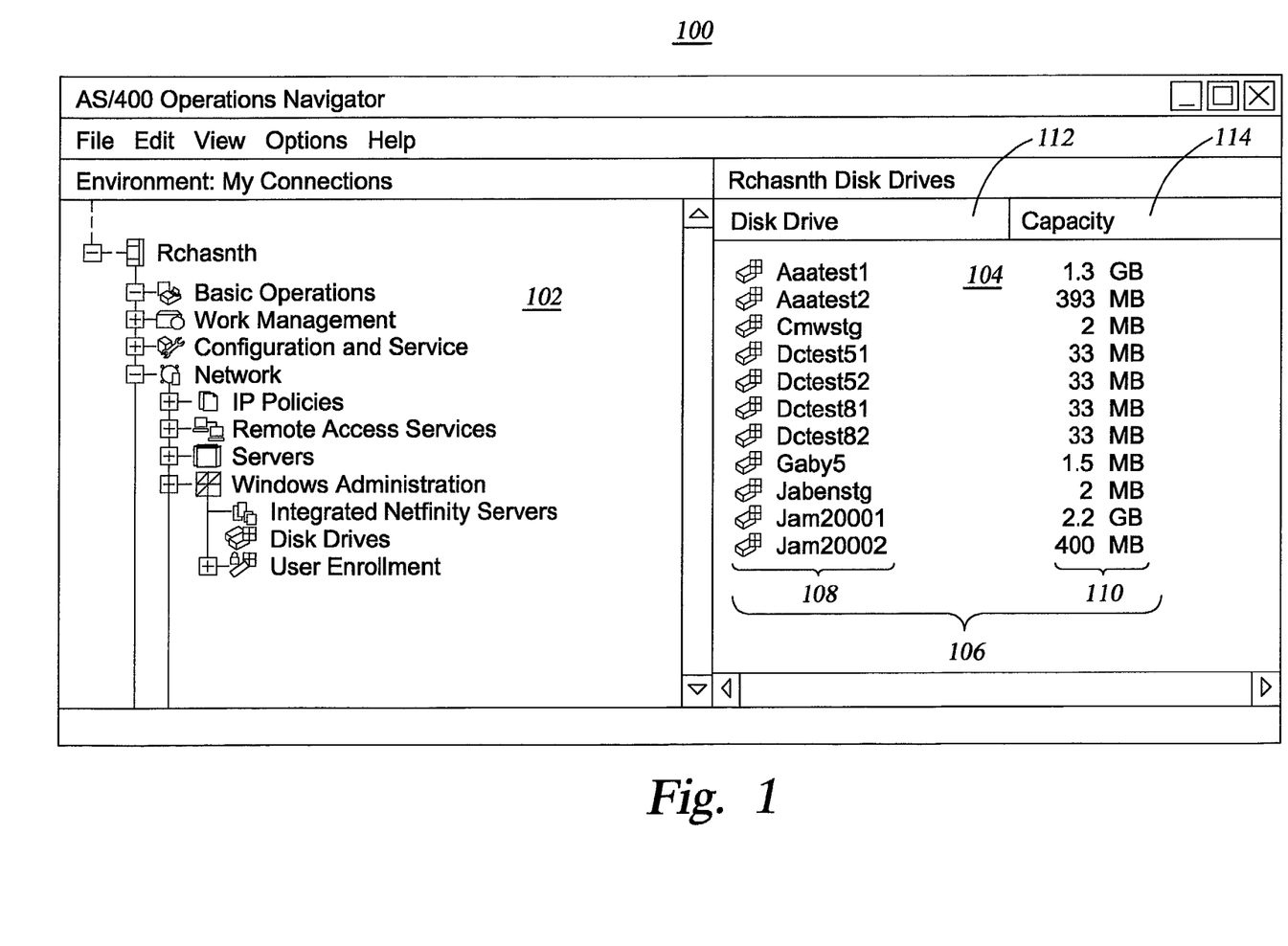
FIG. 1 is a graphical user interface depicting a column sorted by disk drive name.
Figure 2:
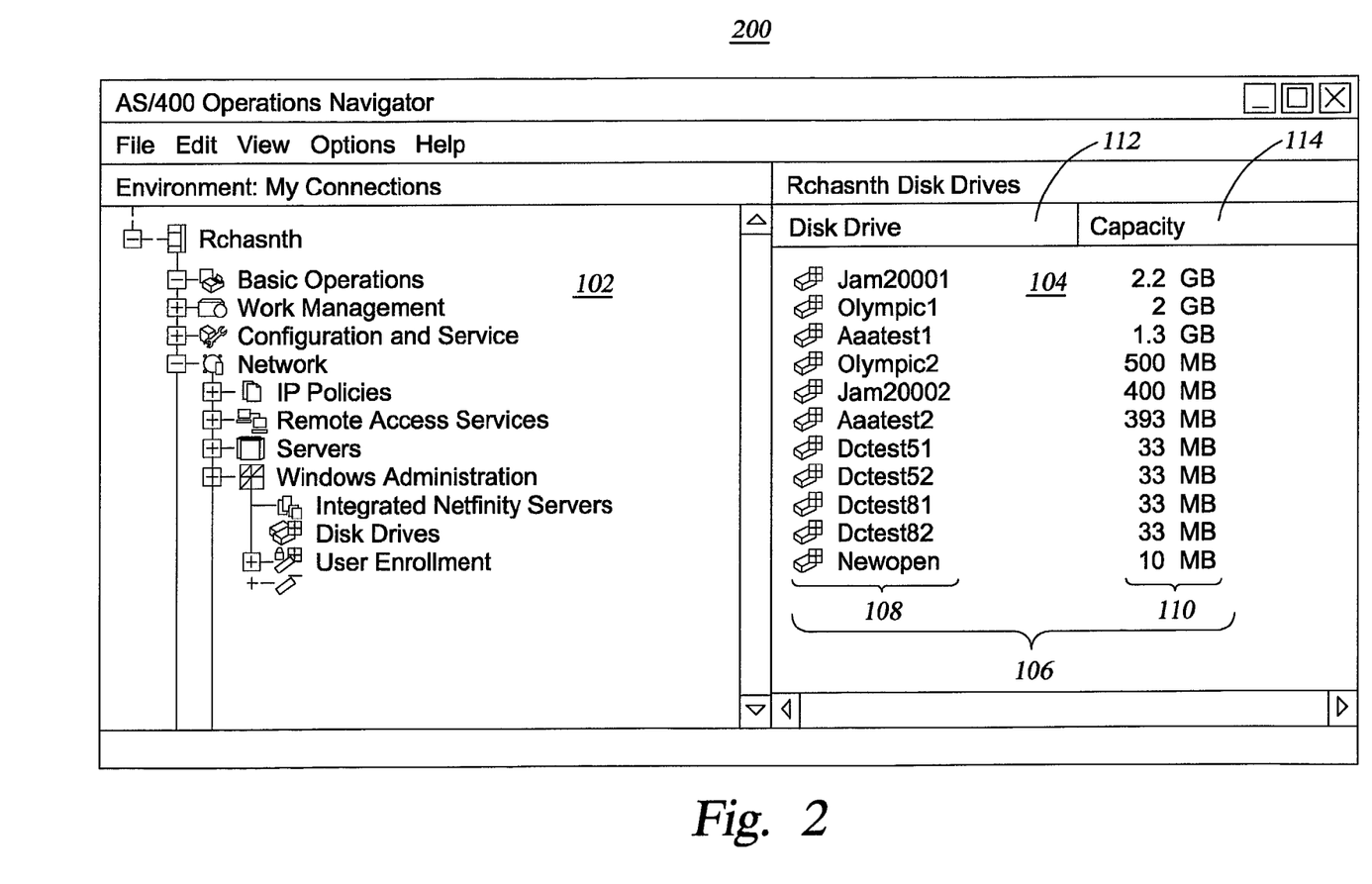
FIG. 2 is a graphical user interface depicting a column sorted by disk drive capacity.

Data sorting may be illustrated with reference to FIG. 1 and FIG. 2. FIG. 1 shows a graphical user interface (GUI) having a pair frames 102 and 104. A first frame 102 contains a plurality of objects on a computer system. A second frame 104 contains a pair of lists 106 associated with an object "Rchasnth". In the particular implementation shown, a Disk Drive list 108 and a Capacity list 110 are provided. The lists 106 are arranged as a series of columns, wherein each item of each column has a corresponding item in the other column. As such, the lists 108, 110 collectively make up a plurality of rows or records.

A user may elect to sort the items of either list 108, 110 by clicking an appropriate button 112,114. Illustratively, FIG. 1 shows the items of the Disk Drive list 108 sorted alphabetically by name. FIG. 2 shows the Capacity list 110 sorted in descending order.

Methods for sorting lists may be described with reference to "viewable data" and "sortable data". The viewable data for a particular row and column in a list is the value(s) that is shown/displayed to the user. For example, assume that the file "Gaby5" shown in the Disk Drive list 108 of FIG. 1 has a capacity of 1,572,864 bytes. FIG. 1 shows one viewable data format for this value: 1.5 MB. Other viewable data formats include "1,572,864 bytes", "1,572,864", "1572864 bytes", "1572864", "1536 KB" and "0.00146 GB". Accordingly, the viewable data value for a particular value can take any of several forms.

The sortable data for a particular row and column in a list is a value that can be compared to values in other rows of the list in such a way that the list can be sorted based on those values. For some types of data, the viewable data values that are shown in the list column are also sortable data values. Far example, if a column in a list contains filename strings such as "File1", "File2", and "File3", then the list can be sorted in ascending or descending order by filename using these filename strings.

However, the sortable data values for a column are not necessarily the same as the viewable data values that are shown to the user. Consider, for example, the files and associated sizes of Table I.

TABLE I

| 0001 | File1: 56832 bytes |
| 0002 | File2: 1572864 bytes |
| 0003 | File3: 71782 bytes |

Assume that a list showing these files has a "size" column. The viewable data values that are shown to the user in the "size" column for these files might be the string values shown in Table II.

TABLE II

| 0001 | File1: "55.5 KB" |
| 0002 | File2: "1.5 MB" |
| 0003 | File3: "70.1 KB" |

In this case, if the list is sorted by the viewable size values shown in Table II, the files would be shown in the following incorrect order: File2, File1, File3. The correct order is: File1, File3, File2. Accordingly, a method for sorting is needed for cases in which sorting by viewable data values results in incorrect list orders.

Figure 3:
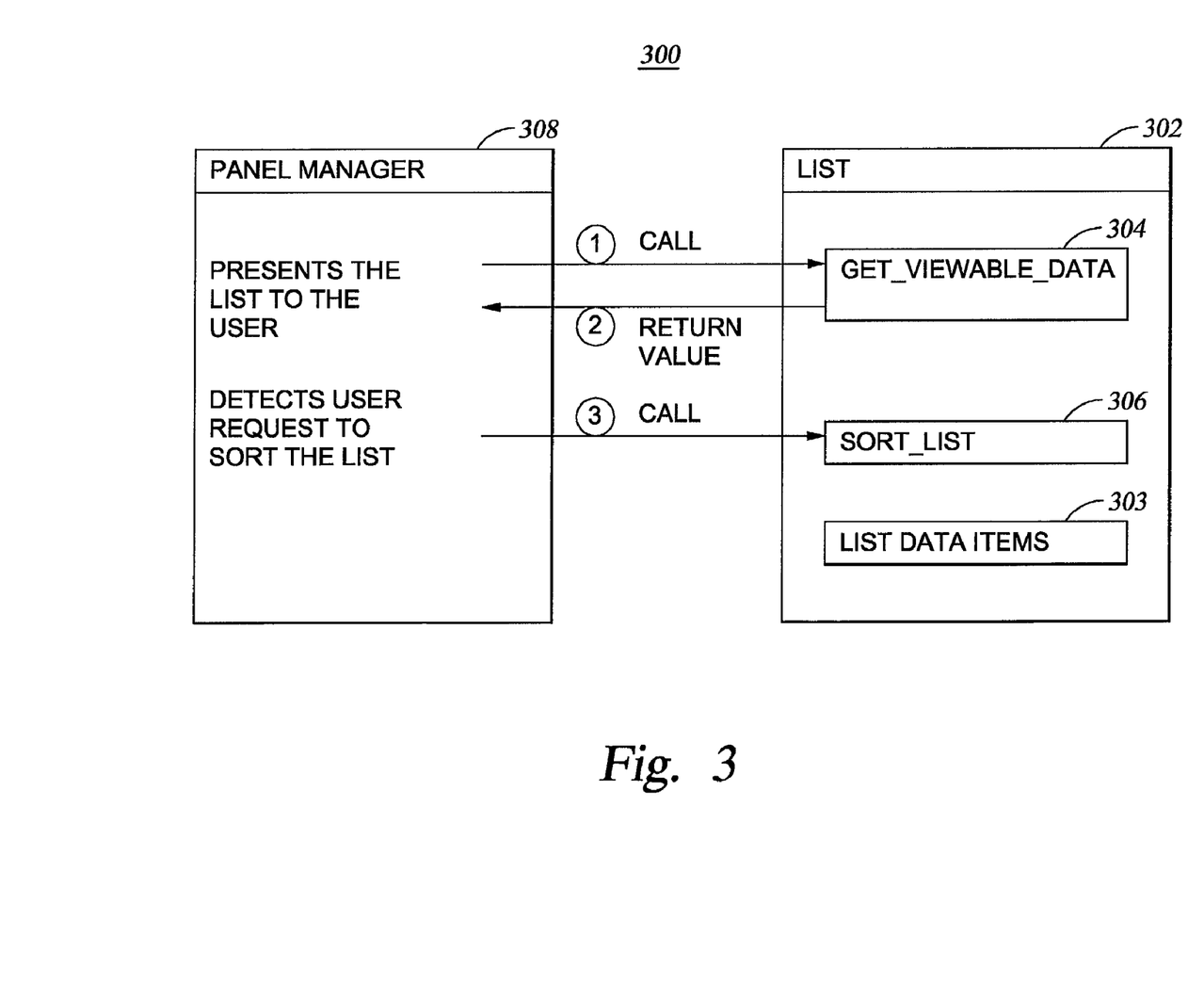
FIG. 3 is a block diagram illustrating relationships between software components of a conventional sorting program.

One attempt to solve the foregoing problem, is to construct a software environment having a List class and a List/Panel Manager. Such a software environment is illustrated in FIG. 3. A "List" 302 contains the actual list data items 303 (rows). The List 302 provides a first method 304 that allows callers to retrieve the viewable data that is shown to the user for particular list item attributes (columns). For example, if a caller requests the viewable data for a 'size' column of an item in the list, the first method 304 retrieves the binary/hexidecimal size value from the list data items 303, converts the value to a string, and returns the string to the caller. Thus, for a binary size value such as 0×00180000, the method 304 might return a string such as "1.5 MB".

The List 302 also provides a second method 306 that allows callers to sort the list based on the values in any of the list columns. Since the second method 306 is implemented as part of the List 302 that manages the list data items, the second method 306 typically accesses the attributes of the list data items 303 when the list needs to be sorted. For example, if the list is to be sorted based on a 'size' value, the second method 306 can access the binary/hexidecimal size values for the list data items 303 so that it can sort the list correctly by size.

A "Panel Manager" 308 presents the list to the user. The Panel Manager 308 handles the user's interaction with the list, such as selecting and performing actions on list items, detecting when the user wants to sort the list on a particular column, etc. The Panel Manager 308 uses the List's first method 304 to get the data that it shows to the user. The Panel Manager 308 uses the List's second method 306 to sort the list on a particular list column.

One problem with the foregoing implementation, is that each type of list (e.g. a file list, a user list, a task list, etc.) implements the functionality defined for the List 302. Thus, each type of list typically implements it's own method for getting the data (the first method 304) and sorting the data (the second method 306). As a result, such sorting environments require multiple implementations of the sorting method 306.

Therefore, there is a need for sorting methods which support sorting of various data formats and preferably reduce the amount of code required.

SUMMARY OF THE INVENTION

Methods, systems and articles of manufacture configured for list sorting are provided. In general, string data or non-string data contained in a plurality of lists is sorted. In order to sort various data types, a generic data retrieval method/component and a specific retrieval method/component are provided. The generic data retrieval method/component may be singular, while an instance of the specific retrieval method/component may be implemented for each list type. In addition, a single generic list sorter is provided and is configured to support sorting of data received from both the generic and specific data retrieval method/components.

In one embodiment, a method of sorting lists in a software environment comprising at least two list types is provided. The method comprises receiving a request to sort data items of a list of a particular list type, calling a generic data retrieval method if the data items are sortable in a default format, calling a specific data retrieval method uniquely defined for the particular list type if the data items are not sortable in the default format and sorting the data items.

Another embodiment provides a method of sorting lists in a software environment comprising a plurality of list types and a sorting program. Illustratively, the sorting program comprises (i) a list sorter and (ii) a list instance for each of the plurality of list types. The list sorter comprises a sorting component and a generic data retrieval component configured to provide data to the sorting component. Each list instance comprises a viewable data retrieval component configured to provide data to the generic data retrieval component and at least one list instance comprising a specific data retrieval component configured to provide data to the sorting component. The method comprises invoking the sorting component in response to receiving a first request to sort data items of a first list instance, calling the specific data retrieval component of the first list instance if the data items of the first list instance are not sortable in a default format and calling the generic data retrieval component if the data items of the first list instance are sortable in the default format. If the generic data retrieval component is called, the method further comprises calling the viewable data retrieval component. The data items of the first list instance are then sorted by the sorting component.

Still another embodiment provides a signal bearing medium, comprising a sorting program which, when executed by a processor, performs a method of sorting lists. In one embodiment, the sorting program comprises (i) a list sorter and (ii) a list instance for each of the plurality of list types. The list sorter comprises a sorting component and a generic data retrieval component configured to provide data to the sorting component. Each list instance comprises a viewable data retrieval component configured to provide data to the generic data retrieval component and at least one list instance comprising a specific data retrieval component configured to provide data to the sorting component. The method comprises invoking the sorting component in response to receiving a first request to sort data items of a first list instance, calling the specific data retrieval component of the first list instance if the data items of the first list instance are not sortable in a default format and calling the generic data retrieval component if the data items of the first list instance are sortable in the default format. If the generic data retrieval component is called, the method further comprises calling the viewable data retrieval component. The data items of the first list instance are then sorted by the sorting component.

BRIEF DESCRIPTION OF THE DRAWINGS

So that the manner in which the above recited features and embodiments are attained and can be understood in detail, a more particular description of embodiments of the invention, briefly summarized above, may be had by reference to the embodiments described below and which are illustrated in the appended drawings.

It is to be noted, however, that the appended drawings illustrate only typical embodiments and are therefore not to be considered limiting of scope, for the invention may admit to other equally effective embodiments.

DETAILED DESCRIPTION OF THE PREFERRED EMBODIMENTS

Figure 4:
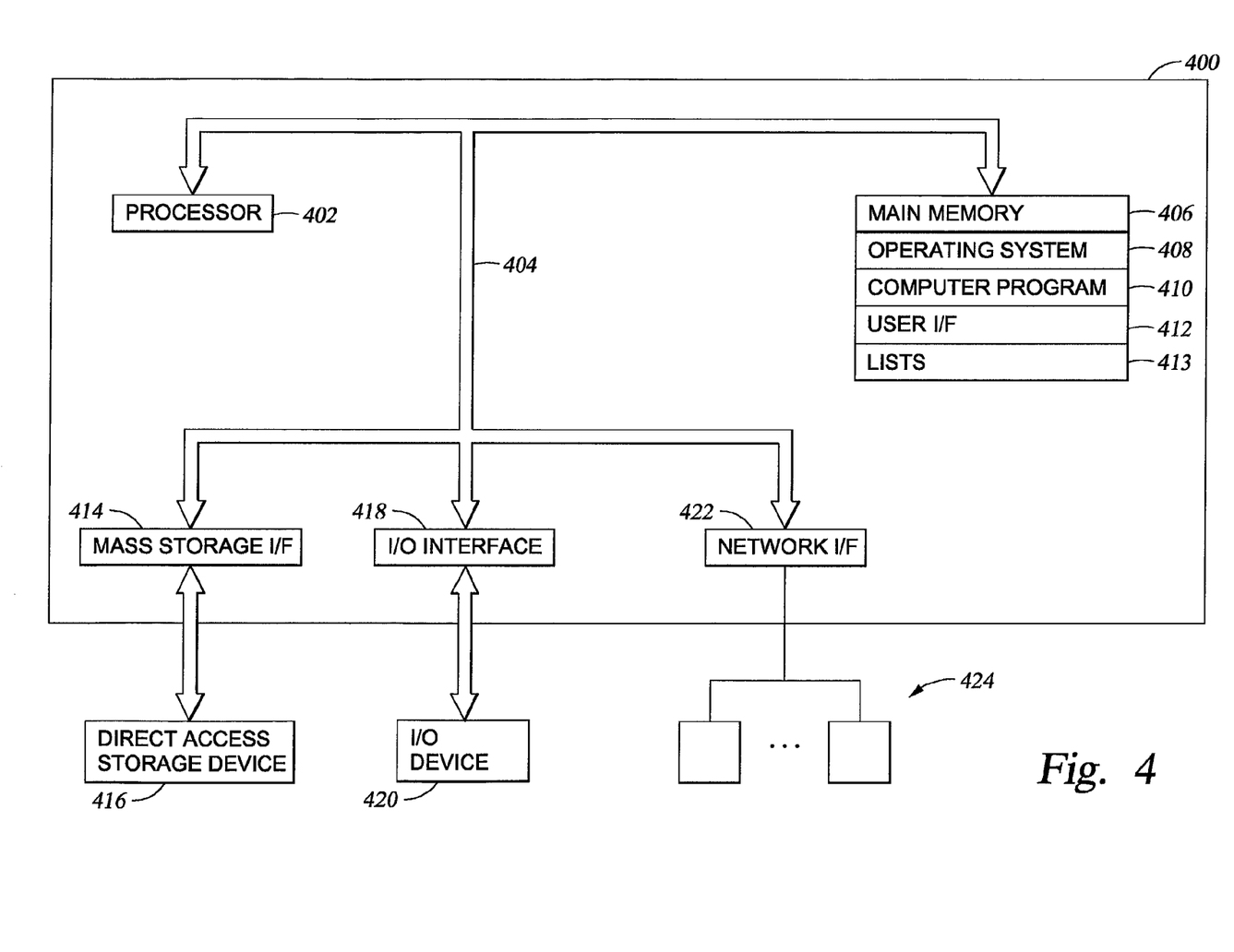
FIG. 4 is a high level diagram of a computer system.

Computer system 400 is shown for a multi-user programming environment that includes at least one processor 402, which obtains instructions and data via a bus 404 from a main memory 406. The processor 402 could be a PC-based server, a minicomputer, a midrange computer, a mainframe computer, etc. adapted to support the methods described below. Illustratively, the processor is a PowerPC available from International Business Machines of Armonk, N.Y.

The main memory 406 includes an operating system 408, a sorting program 410, a plurality of lists 413 and a user interface program 412. The main memory 406 could be one or a combination of memory devices, including Random Access Memory, nonvolatile or backup memory, (e.g., programmable or Flash memories, read-only memories, etc.) and the like. In addition, memory 406 may be considered to include memory physically located elsewhere in a computer system 400, for example, any storage capacity used as virtual memory or stored on a mass storage device or on another computer coupled to the computer system 400 via bus 404.

The computer system 400 includes a number of operators and peripheral systems. Illustratively, these include a mass storage interface 414 operably connected to a direct access storage device 416, a input/output (I/O) interface 418 operably connected to I/O devices 420, and a network interface 422 operably connected to a plurality of networked devices 424. The I/O devices may include any combination of displays, keyboards, track point devices, mouse devices, speech recognition devices and the like. In some embodiments, the I/O devices are integrated, such as in the case of a touch screen. The networked devices 424 could be displays, desktop or PC-based computers, workstations, or network terminals, or other networked computer systems.

In general, the routines executed to implement the embodiments of the invention, whether implemented as part of an operating system or a specific application, component, program, object, module or sequence of instructions will be referred to herein as a "sorting program 410", or simply "program 410". The program 410 typically comprises one or more instructions that are resident at various times in various memory and storage devices in a computer, and that, when read and executed by one or more processors in a computer, cause that computer to perform the steps necessary to execute steps or elements embodying the various aspects of the invention.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Moreover, while the embodiments have and hereinafter will be described in the context of fully functioning computers and computer systems, those skilled in the art will appreciate that the various embodiments of the invention are capable of being distributed as a program product in a variety of forms, and that embodiments of the invention apply equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROMs, DVDs, etc.), and transmission type media such as digital and analog communication links. Transmission type media include information conveyed to a computer by a communications medium, such as through a computer or telephone network, and includes wireless communications. The latter embodiment specifically includes information downloaded from the Internet and other networks. Such signal-bearing media, when carrying computer-readable instructions that direct the functions of the present invention, represent embodiments of the present invention.

When executed, the sorting program 410 is configured to sort data contained in the plurality of lists 413. In a particular embodiment, the data to be sorted is organized as a column of a list. However, the organization of the data is not limiting of the scope of the present invention. In general, the data may be string or non-string data. Further, the plurality of lists 413 comprise at least two list types (e.g. a file list, a user list, a task list, etc.). In particular, one list type contains string data and one list type contains non-string data. In order to sort various data types (generally, string data and non-string data), the sorting program 410 is configured with a generic data retrieval method/component and a specific retrieval method/component. In addition, a single generic list sorter is provided and is configured to support sorting of data received from both the generic and specific data retrieval method/components.

Figure 5:
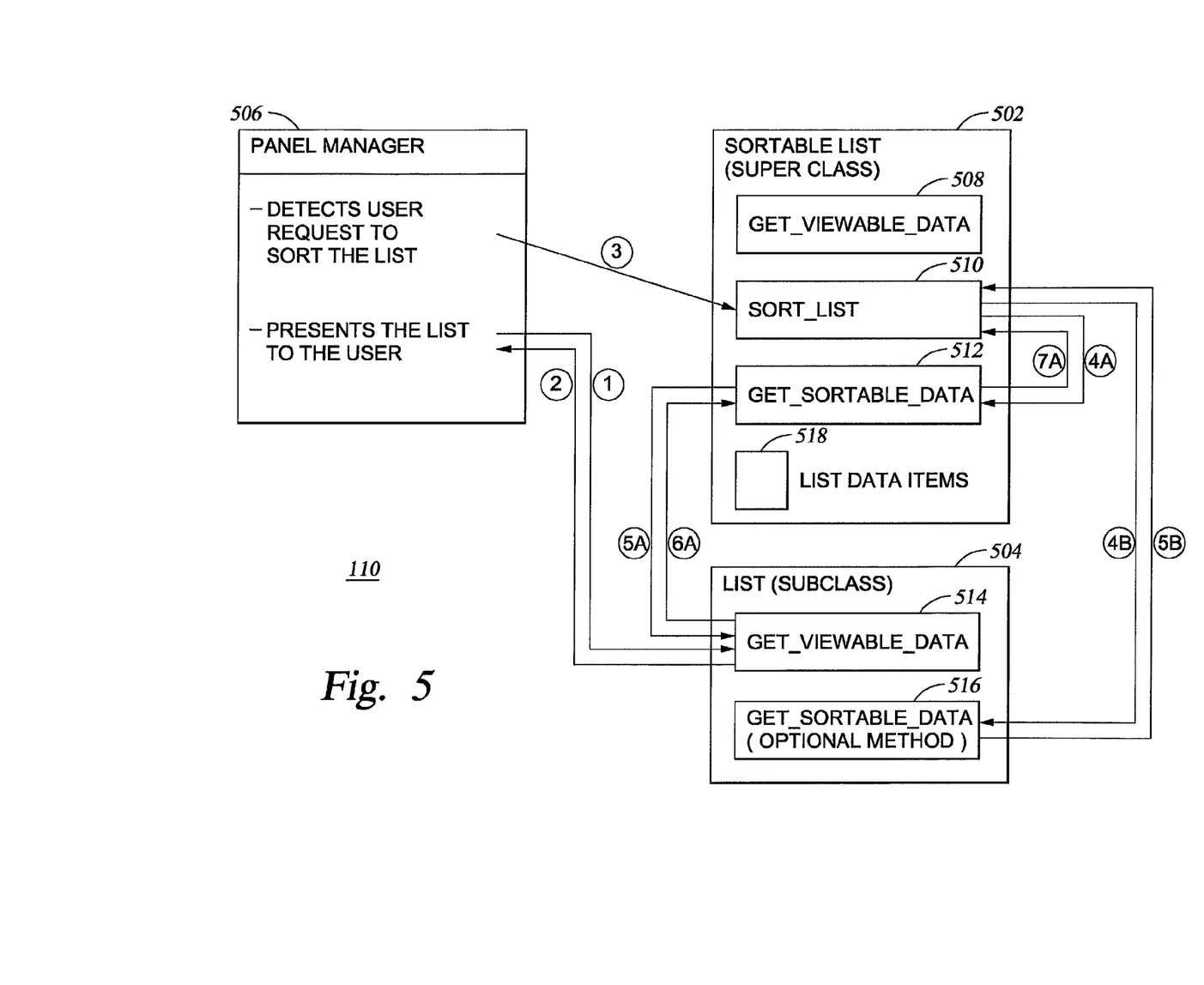
FIG. 5 is a block diagram illustrating relationships between software components of a sorting program.

The operational relationship of the sorting program 410 may be more particularly understood with reference to FIG. 5 which provides an exemplary software environment for the computer system 400 of FIG. 4. In a particular embodiment, the sorting program 410 is implemented as a Java program. However, the particular program language is not germane to embodiments of the invention and is therefore not considered limiting. In other embodiments, object oriented languages such as C++, Object Pascal, Smalltalk and the like may be used to advantage.

As shown in FIG. 5, the sorting program 410 comprises a Sortable List 502, a List 504 and a Panel Manager 506. A particular sequence of events is represented by path numerals associated with the arrows connecting the components of the sorting program 410. In general, the panel manager 506 is configured to present a list to a user and to detect a user request to sort the list. The panel manager 506 then calls on various methods defined for each of the sortable list 502 and the list 504 to implement the sorting.

In a particular embodiment, the software environment shown in FIG. 5 is an object-oriented environment. In object-oriented programming, all classes are arranged in a strict hierarchy. Each class in the hierarchy has superclasses (classes above it in the hierarchy) and any number of subclasses (classes below it in the hierarchy). Subclasses inherit attributes and behavior from their superclasses. In the context of the present application, the sortable list 502 is the superclass and the list 504 is the subclass. In particular, the list 504 inherits an attribute list data items 518, a method SORT_LIST 510, and a method GET_SORTABLE_DATA 512 from the sortable list 502. The foregoing classes, methods and attributes are described in more detail below.

The list data items 518 to be sorted are contained in the sortable list 502. In one embodiment, the list data items 518 are "protected data" in the sortable list 502. "Protected" data in a superclass is data that can be accessed directly by any of its subclasses. The list 504 is responsible for managing what data items are stored in the list data items 515 and can access the protected list data items 518 directly. The sortable list 502 can reorder the Items in the list 518, but does not have knowledge of the type of items in the list or their attributes. Therefore, the sortable list 502 uses the GET_SORTABLE_DATA 512 or GET_SORTABLE_DATA 516 method to retrieve the sortable values that it uses to sort the list.

A particular list 504 is a subclass representing a particular type of list. The list 504 controls the type of data that is stored in the list data items 518. Accordingly, an instance of the list 504 is provided for each list having a different column format. In order for viewable data to be retrieved and shown to a user, the list 504 defines a GET_VIEWABLE_DATA method 514. As shown by paths one (1) and two (2), the panel manager 506 initially calls the GET_VIEWABLE_DATA method 514 which, in turn, returns viewable data to the panel manager 506.

Some instances of the list 504 also comprise a GET_SORTABLE_DATA method 516. The GET_SORTABLE_DATA method 516 is configured to provide sortable data to the Sortable list 502 (specifically, a SORT_LIST 510 defined for the Sortable list 502). The GET_SORTABLE_DATA method 516 provides sorting support for a particular list type and is therefore unique to the list type. Whether or not a list 504 has a GET_SORTABLE_DATA method 516 defined for it depends on the nature of the data to be sorted. Specifically, any list 504 in which the list data items 518 may be properly sorted by the Sortable list 502 using a default state of the data (i.e., the viewable string representation of the data) does not include a GET_SORTABLE_DATA method 516. In such cases, the list data items 518 are sorted by the sortable list 502.

The sortable list 502 is a superclass that implements generic list sorting support. By generic, is meant that the sortable list 502 is not configured for a particular list type, but instead supports sorting for any list type. One limitation on the ability of the sortable list 502 to sort, is the nature of the data to be sorted. Specifically, where the data is not sortable in its default state (i.e., as viewable data), the data must first be transformed, or reformatted to be sortable. This transformation is done by the GET_SORTABLE_DATA method 516 of a particular instance of the list 504.

In one embodiment, the sortable list 502 comprises an abstract method GET_VIEWABLE_DATA 508, a SORT_LIST method 510, and GET_SORTABLE_DATA method 512. "Abstract methods", such as GET_VIEWABLE_DATA 508, are methods with signatures but no implementation. Subclasses of the class that contains the abstract method must provide its actual implementation. In the context of the present application, the sortable list 502 contains the abstract method GET_VIEWABLE_DATA 508 and the list 504 contains the GET_VIEWABLE_DATA 514 implementation of the method.

The SORT_LIST method 510 is configured to sort a list on the specified column. The sort order may be in ascending or descending order according to the user specified commands. As represented by path 3, the method 510 is called when a user requests to sort the list items 518 on a given table column.

The GET_SORTABLE_DATA method 512 is configured to retrieve sortable data for a particular row and column. Specifically, the method 512 requests and receives (along paths 5A and 6A, respectively), from the GET_VIEWABLE_DATA method 514, a sortable value representing a default string representation of the data for a particular row and column. The method 512 then returns (along path 7A) the sortable value to the SORT_LIST.

In operation, a request to sort a list invokes the SORT_LIST method 510 to call either the GET_SORTABLE_DATA method 512 or the GET_SORTABLE_DATA method 516. This alternative is represented by numerals 4A and 4B. In the first case, the method 512 calls the GET_VIEWABLE_DATA method 514, which returns viewable data (which in this case is also sortable data) to the method 512. The method 512 provides the viewable data to the SORT_LIST method 510, which then sorts the list items.

In the second case, the method 516 is configured to return sortable values corresponding to the list items which allow the list to be properly sorted by the SORT_LIST method 510. In one embodiment, a list is sorted based on the binary or hexadecimal representation of data. Consider, for example, the files shown in Table I. Table III shows hexadecimal string representations of the file size values that can be properly sorted by the SORT_LIST method 510.

TABLE III

| 0001 | File1: 0x0000de00 |
| 0002 | File2: 0x00180000 |
| 0003 | File3: 0x00011866 |

In another embodiment, list data may be padded such that the string representation of each data item (i.e., row) is of a fixed length. An example of a zero-padded string representation is shown in Table IV. Note that without padding the size values, an incorrect ascending sorting order may occur: File2, File1, File3. After padding the size values, sorting results in the correct order: File1, File3, File2.

TABLE IV

| 0001 | File1: "0000056832" |
| 0002 | File2: "0001572864" |
| 0003 | File3: "0000071782" |

The foregoing examples are illustrative methods of alternative file size representations, whereby a list can be correctly sorted by size. More generally, any method of transforming data into sortable data may be used to advantage.

As will be appreciated from the above description with reference to FIG. 5, embodiments described herein utilize "overriding". Overriding a method means creating a method in a subclass that has the same signature (name, number and type of arguments) as a method in a superclass. The new method then hides the superclass's method. In the context of the present application, the list 504 implements the GET_VIEWABLE_DATA 514 method that overrides the GET_VIEWABLE_DATA 508 method in the sortable list 502. Optionally, the list 504 implements the GET_SORTABLE_DATA 516 method that overrides the GET_SORTABLE_DATA 512 method in the sortable list 502.

Figure 6:
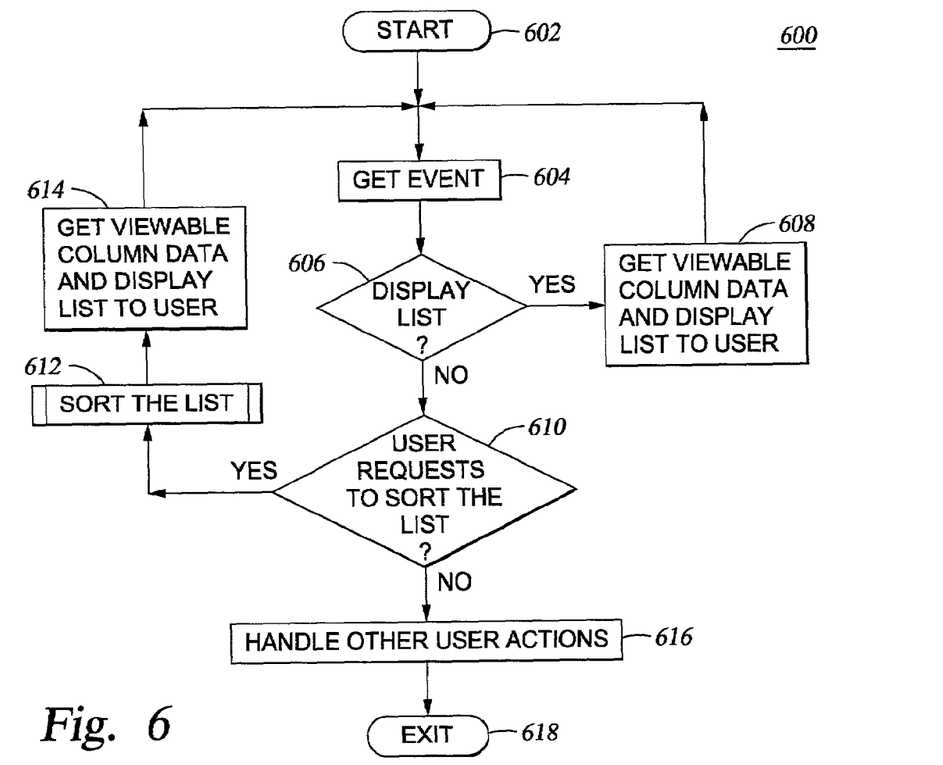
FIG. 6 is a flow chart illustrating event handling.

One embodiment of a method 600 for handling user initiated actions on the computer system 400 is described with reference to FIG. 6. Illustratively, the method 600 may represent the operation of the panel manager 506. Method 600 is entered at step 602 and proceeds to step 604 to receive an event. At step 606, the method 600 queries whether the event is to display a list. If so, the viewable column data is retrieved and the list is displayed to the user at step 608. The method 600 then returns to step 604 to receive another event.

If step 606 is answered negatively, the method 600 proceeds to step 610 and queries whether the event is a user request to sort a list. If so, the method 600 proceeds to step 612 where the list is sorted. One embodiment of a method for sorting the list is described below with reference to FIG. 7. Once the list is sorted, the list is displayed to the user at step 614. The method 600 then returns to step 604 to receive another event.

If step 610 is answered negatively, the method 600 handles the event at step 616 according to the configuration of the computer system 400. The method 600 then exits at step 618. Alternatively, the method 600 may return to step 604 to process additional events.

Figure 7:
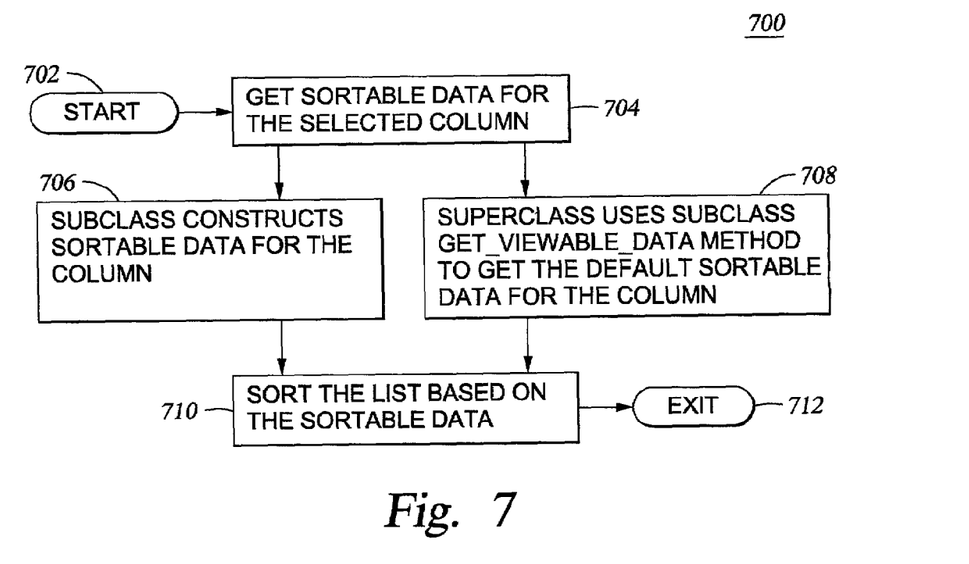
FIG. 7 is a flow chart illustrating a method of sorting a list.

FIG. 7 shows a method 700 for sorting a list and may be understood to represent step 612 described above. In addition, the method 700 may embody the operation of the sortable list 502 and the list 504.

Method 700 is entered at step 702 and proceeds to step 704 to begin processing a call to get sortable data for a selected column. In the context of the software environment shown in FIG. 5, the logic of step 704 is configured to call either the GET_SORTABLE_DATA method 512 defined for the sortable list 502, or the GET_SORTABLE_DATA method 516 defined for the list 504 (if such a method is defined for the list 504).

If a GET_SORTABLE_DATA method 516 is defined for the list 504, the list data items 518 contain at least one column that is presumably not in a string representation capable of being sorted by the sortable list 502. This is so because a list could contain multiple columns (e.g. a file list with a 'name' and a 'size' column) and some of those columns might contain data that can be sorted using the viewable data (e.g. the 'name' column), while other columns might contain data that cannot be sorted using the viewable data (e.g. the 'size' column). If any of the columns in the list cannot be sorted using the viewable data, then the list 504 implements the GET_SORTABLE_DATA 516 method. Once the list 504 implements the GET_SORTABLE_DATA 516 method, that method is called when sorting any column of that list. As a result, there will be cases where the GET_SORTABLE_DATA 516 method is called for a column of a list 504 that is sortable by the viewable data. When this occurs, the GET_SORTABLE_DATA 516 method may simply return the same viewable data for that column that the GET_VIEWABLE_DATA method 514 would return.

Accordingly, the method 700 proceeds to step 706 where the list 504 constructs sortable data for the column to be sorted. At step 710, the list is sorted based on the sortable data provided from step 706. Accordingly, the collective logic of steps 704, 706 and 710 corresponds to the path 4B, 5B shown in FIG. 5.

If a GET_SORTABLE_DATA method 516 is not defined for the list 504, the list data items 518 are presumably in a format capable of being sorted by the sortable list 502. In this case, at step 708, sortable data for the column is retrieved by the sortable list 502 using the GET_VIEW- ABLE_DATA method 514 defined for the list 504. The method 700 then proceeds to step 710 where the list is sorted by the sortable list 502. The method 700 exits at step 712.

Accordingly, the foregoing embodiments may be used to advantage for sorting data represented in various formats. In particular, the sortable list 502 supports generically sorting for data which is, by default, represented as a sortable string. For those lists in which data is not represented as a sortable string, a method for transforming the data is defined. In this manner, only some list 504 require a GET_SORTABLE_DATA method 516. In addition, a single implementation of a SORT_LIST method 510 is sufficient to support all sorting. Each of the foregoing aspects results in a minimalization of code required to support sorting of data.

While the foregoing is directed to the preferred embodiment of the present invention, other and further embodiments of the invention may be devised without departing from the basic scope thereof, and the scope thereof is determined by the claims that follow.

What is claimed is:

1. A method of sorting lists in a software environment comprising a plurality of list types and a sorting program, wherein the sorting program comprises (i) a list sorter comprising a sorting component and a generic data retrieval component configured to provide data to the sorting component; and (ii) a list instance for each of the plurality of list types, each list instance comprising a viewable data retrieval component configured to provide data to the generic data retrieval component and at least one list instance comprising a specific data retrieval component configured to provide data to the sorting component; the method comprising:
    invoking the sorting component in response to receiving a first request to sort data items of a first list instance;
    calling the specific data retrieval component of the first list instance if the data items of the first list instance are not sortable in a default format;
    calling the generic data retrieval component if the data items of the first list instance are sortable in the default format;
    if the generic data retrieval component is called, calling the viewable data retrieval component;
    sorting, by the sorting component, the data items of the first list instance; and outputting the sorted data items to a user.

2. The method of claim 1, wherein calling the specific data retrieval component of the first list instance comprises overriding the generic data retrieval component.

3. The method of claim 1, wherein at least a portion of the list instances do not include the specific data retrieval component.

4. The method of claim 1, wherein the specific data retrieval component is configured to transform the data items of the first list instance from the default format into a format sortable by the sorting component.

5. The method of claim 2, wherein transforming the data items from the default format to the format sortable by the sorting component comprises padding the data items with values so that each data item is of a same length.

6. The method of claim 1, wherein if the specific data retrieval component is called, returning the data items in a sortable format to the sorting component without invoking the viewable data retrieval component, wherein the sortable format is different from the default format if the default format is not sortable and is the same as the default format if the default format is sortable; and wherein if the viewable data retrieval component is called, returning the data items in the default format to the sorting component.

7. The method of claim 1, wherein if the specific data retrieval component is called, further comprising:
    transforming the data items from the default format to a sortable format; and
    returning the data items in the sortable format to the sorting component.

8. The method of claim 6, wherein transforming the data items from the default format to the sortable format comprises padding the data items with values so that each data item is of a same length.

9. A computer-readable storage medium, comprising a sorting program, wherein the sorting program comprises (i) a list sorter comprising a sorting component and a generic data retrieval component configured to provide data to the sorting component; and (ii) a list instance for each of a plurality of list types, each list instance comprising a viewable data retrieval component configured to provide data to the generic data retrieval component and at least one list instance comprising a specific data retrieval component configured to provide data to the sorting component; wherein the sorting program, when executed by a processor, performs a method of sorting lists, comprising:
    invoking the sorting component in response to receiving a first request to sort data items of a first list instance;
    calling the specific data retrieval component of the first list instance if the data items of the first list instance are not sortable in a default format;
    calling the generic data retrieval component if the data items of the first list instance are sortable in the default format;
    if the generic data retrieval component is called, calling the viewable data retrieval component; and
    sorting, by the sorting component, the data items of the first list instance.

10. The computer-readable storage medium of claim 9, wherein at least a portion of the list instances do not include the specific data retrieval component.

11. The computer-readable storage medium of claim 9, wherein the specific data retrieval component is configured to transform the data items of the first list instance from the default format into a format sortable by the sorting component.

12. The computer-readable storage medium of claim 9, wherein calling the specific data retrieval component of the first list instance comprises overriding the generic data retrieval component.

13. The computer-readable storage medium of claim 9, wherein if the specific data retrieval component is called, returning the data items in a sortable format to the sorting component without invoking the viewable data retrieval component, wherein the sortable format is different from the default format if the default format is not sortable and is the same as the default format if the default format is sortable; and wherein if the viewable data retrieval component is called, returning the data items in the default format to the sorting component.

14. The computer-readable storage medium of claim 9, wherein if the specific data retrieval component is called, further comprising:
    transforming the data items from the default format to a sortable format; and
    returning the data items in the sortable format to the sorting component.

15. The computer-readable storage medium of claim 14, wherein transforming the data items from the default format to the sortable format comprises padding the data items with values so that each data item is of a same length.

16. A computer-implemented method of sorting lists in a software environment comprising at least two list types, the method comprising:
- receiving a request to sort data items of a list of a particular list type;
- calling a generic data retrieval method because the data items are sortable in a default format;
- calling a specific data retrieval method uniquely defined for the particular list type because the data items are not sortable in the default format;
- sorting the data items, wherein sorting the data items comprises providing the data items to a list sorter for which the generic data retrieval method is defined; wherein the list sorter and the generic data retrieval method are components of a class and the specific data retrieval method is a component of a subclass; and
- outputting the sorted data items to a user.

17. A computer readable storage medium, comprising a program, wherein the program, when executed by a processor, performs an operation of sorting lists in a software environment comprising at least two list types, the operation comprising:
- receiving a first request to sort data items of a first list of a first particular list type;
- calling a generic data retrieval method because the data items of the first list are sortable in their default format;
- sorting the data elements of the first list in their default format;
- receiving a second request to sort data items of a second list of a second particular list type;
- calling a specific data retrieval method uniquely defined for the second particular list type because the data items of the second list are not sortable in their default format;
- when the specific data retrieval method is called, transforming the data items of the second list from their default format to a sortable format, wherein transforming the data items of the second list from their default format to the sortable format comprises padding the data items with values so that each data item is of a same length; and
- sorting the data items of the second list in the sortable format.

18. A computer readable storage medium, comprising a program, wherein the program, when executed by a processor, performs an operation of sorting lists in a software environment comprising at least two list types, the operation comprising:
- receiving a first request to sort data items of a first list of a first particular list type;
- calling a generic data retrieval method because the data items of the first list are sortable in their default format;
- sorting the data elements of the first list in their default format;
- receiving a second request to sort data items of a second list of a second particular list type;
- calling a specific data retrieval method uniquely defined for the second particular list type because the data items of the second list are not sortable in their default format, whereby the data items of the second list are transformed into a sortable format; and
- sorting the data items of the second list in the sortable format;

wherein sorting the data items of the first and second lists comprises providing the data items to a list sorter for which the generic data retrieval method is defined; and wherein the list sorter and the generic data retrieval method are components of a class and the specific data retrieval method is a component of a subclass.

* * * * *